United States Patent [19]

Hahn et al.

[11] Patent Number: 4,730,030

[45] Date of Patent: Mar. 8, 1988

[54] ARYLCYCLOBUTANE/DIENOPHILE COPOLYMER

[75] Inventors: Stephen F. Hahn; Robert A. Kirchhoff, both of Midland, Mich.

[73] Assignee: The Dow Chemical Company, Midland, Mich.

[21] Appl. No.: 890,671

[22] Filed: Jul. 25, 1986

[51] Int. Cl.$^4$ .................... C08F 12/32; C08F 32/00
[52] U.S. Cl. .................... 526/262; 526/263; 526/284; 528/170; 528/322
[58] Field of Search ............ 526/262, 284, 263; 585/27; 528/322, 170

[56] References Cited

PUBLICATIONS

Patterson, A. M., Capell, L. T. and Walker, D. F.: The Ring Index (second edition), American Chemical Society (1960), Ring Structure 833, p. 114.

Primary Examiner—Harold D. Anderson

[57] ABSTRACT

Copolymer compositions comprise, in polymerized form, a comonomer containing at least two polymerizable arylcyclobutane moieties, and a comonomer containing at least two polymerizable dienophilic moieties, such as maleimide moieties.

7 Claims, No Drawings

ARYLCYCLOBUTANE/DIENOPHILE COPOLYMER

BACKGROUND OF THE INVENTION

This invention relates to arylcyclobutane copolymer compositions.

Arylcyclobutane resins are a family of monomers, oligomers, prepolymers and polymers. Poly(arylcyclobutane) polymers are disclosed in U.S. Pat. No. 4,540,763. The polymers are prepared by heating a resin having two or more arylcyclobutane moieties to temperatures sufficient to open the cyclobutane rings. The opened cyclobutane rings react with each other to form a crosslinked polymer.

The poly(arylcyclobutane) polymers exhibit excellent thermal and oxidative stability. They can be used as coatings, adhesives, composites and the like. However, U.S. Pat. No. 4,540,763 discloses that the polymers can only be prepared from arylcyclobutane-containing monomers.

In view of the excellent properties exhibited by arylcyclobutane polymers, it would be desirable to have compounds and methods for preparing copolymers of arylcyclobutane monomers and other comonomers.

SUMMARY OF THE INVENTION

This invention is a copolymer composition comprising, in polymerized form, a comonomer containing at least two polymerizable arylcyclobutane moieties and a comonomer containing at least two polymerizable dienophilic moieties.

The mixture of the dienophilic comonomer and arylcyclobutane comonomer provides a reactive comonomer system which is useful in preparing copolymer compositions. The copolymer compositions can exhibit improved properties such as adhesion, thermal stability, solvent resistance, dielectric constant, etc. compared to homopolymer compositions prepared from either comonomer. The copolymer compositions of this invention can be thermoplastic or thermoset polymeric compositions and can be used in conventional thermoplastic and thermoset applications. Examples of such uses include adhesives, coatings, composites and the like.

DETAILED DESCRIPTION OF THE INVENTION

The arylcyclobutane monomers of this invention include monomers, prepolymers and oligomeric chains with at least two polymerizable arylcyclobutane moieties. An arylcyclobutane moiety is polymerizable when addition polymerization sites are provided under ring-opening conditions. Suitable arylcyclobutane monomers, prepolymers and oligomers and their preparation are disclosed in U.S. Pat. No. 4,540,763, herein incorporated by reference. Methods of making the arylcyclobutane precursors are disclosed in U.S. Pat. Nos. 4,562,280 and 4,570,011, both herein incorporated by reference.

Preferably, the arylcyclobutane monomers are benzocyclobutane monomers, and can be represented by the formula:

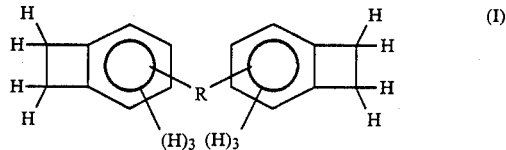

wherein R is a polyvalent organic or inorganic moiety, or a direct bond.

An especially preferred monomer is a reaction product of styrene and 4-vinylbenzocyclobutane. To prepare such a monomer styrene is contacted with 4-vinylbenzocyclobutane in the presence of a suitable free-radical initiator, such as azobisisobutyronitrile. The styrene and 4-vinylbenzocyclobutane compounds are added in any amount sufficient to provide two polymerizable benzocyclobutane moieties. This monomer can be called poly(styrene-co-4-vinylbenzocyclobutane), and corresponds to the formula

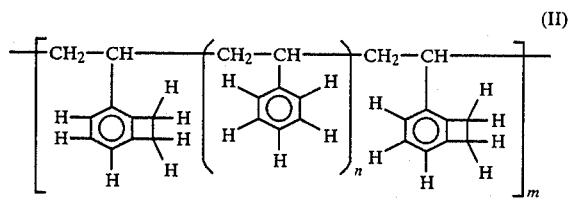

wherein n and m are integers of at least 1.

A preferred benzocyclobutane monomer having an R group containing aromatic rings can be prepared by contacting 4,4'-isopropylidine diphenol (bisphenol A) with benzocyclobutane 4-acid chloride in the presence of triethylamine and methylene chloride. The bisphenol A and benzocyclobutane compounds are added in any amounts sufficient to provide two polymerizable benzocyclobutane moieties, and the R group corresponds to the formula

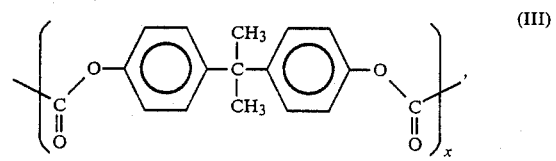

A preferred benzocyclobutane monomer having an R group containing amino groups can be prepared by contacting a diamino-alkane with 4-benzocyclobutyl carboxylic acid in the presence of 1,1-carboxyldiimidazole. The diamino-alkane and benzocyclobutane compounds are added in any amounts sufficient to provide two benzocyclobutane moieties, and the R group corresponds to the formula

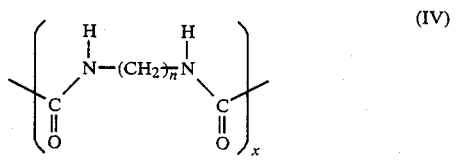

wherein n is at least 1.

A preferred benzocyclobutane monomer having an R group containing unsaturated hydrocarbon groups can be prepared by contacting a divinylbenzene monomer with 4-bromobenzocyclobutane in the presence of a suitable palladium catalyst. The divinylbenzene and benzocyclobutane compounds are added in any amounts sufficient to provide two polymerizable benzocyclobutane moieties, and the R group corresponds to the formula

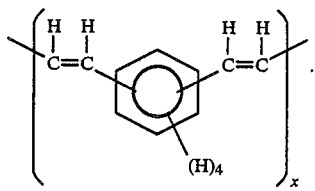
(V)

A preferred benzocyclobutane monomer having an R group containing siloxane groups can be prepared by contacting 1,1,3,3-tetramethyl-1,3-divinyl disiloxane with 4-bromobenzocyclobutane in the presence of a suitable palladium catalyst, the divinyl siloxane and benzocyclobutane compounds are added in any amounts sufficient to provide two polymerizable benzocyclobutane moieties, and the R group corresponds to the formula

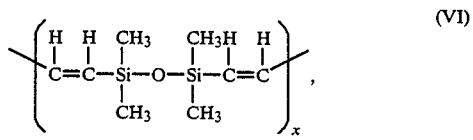
(VI)

In Formulae III through VI, x is at least 1.

Many other benzocyclobutane monomers which can be employed as a comonomer in this invention are disclosed in U.S. Pat. No. 4,540,763.

The arylcyclobutane monomers can be heterocyclic arylcyclobutane monomers. Preferred heterocyclic arylcyclobutane monomers are cyclobutapyridine monomers, which ideally correspond to the formula

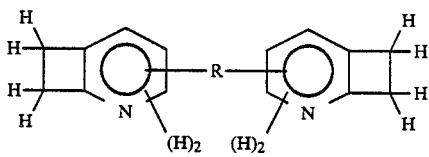

wherein R is as defined above.

Methods for preparing cyclobutapyridines and substituted cyclobutapyridines are disclosed by J. M. Riemann and W. S. Trahanovsky in *Tetrahedron Letters*, No. 22, pp. 1867–1870 (1977), (cyclobuta[b]pyridine and cyclobuta[c]pyridine); and by W. D. Crow, A. N. Khan and M. N. Paddoa-Row in *Australian Journal of Chemistry*, No. 28, pp. 1741–1754 (1975), (2-methylcyclobuta[b]pyridine). Methods suitable for preparing other substituted cyclobutapyridines are suggested in the following references for the indicated compounds: in *Organic Reactions*, Vol. I, p. 91 (2-aminocyclobuta[b]pyridine); in Berichte, No. 57, p. 791, and p. 1802 (1924), (2-hydroxycyclobuta[b]pyridine is prepared from 2-aminocyclobuta[b]pyridine); by Hatinger and Lieben in Monatschaft, No. 6, p. 279 (1885), and Rath, *Annalan Chemische*, No. 486, p. 71 (1931), (2-chlorocyclobuta[b]pyridine is prepared from 2-hydroxycyclobuta[b]pyridine).

The substituted heterocyclic arylcyclobutane compounds can be used to prepare heterocyclic arylcyclobutane monomers. For example, a maleamic acid derivative of cyclobutapyridine can be prepared by contacting 2-aminocyclobutapyridine with maleic anhydride in the presence of a suitable organic solvent, such as chloroform, at suitable reaction temperatures. From about equal molar to about a greater molar amount of 2-aminocyclobutapyridine per maleic anhydride is employed. The maleamic acid derivative of cyclobutapyridine can be employed to prepare 2-[N-maleimido]cyclobutapyridine by treating the maleamic acid derivative at suitable reaction temperatures in a suitable organic solvent, for example, sodium acetate in acetic acid. Suitable reaction temperatures include the range of 100° C. to 120° C.

In another example, 2-bromocyclobutapyridine can be employed to prepare 2-vinylcyclobutapyridines. The bromocyclobutapyridine is contacted with excess ethylene at suitable pressure in the presence of a suitable catalyst system and solvent, and at suitable reaction temperatures. Suitable catalyst systems include palladium (II) acetate; and a suitable cocatalyst is tri-o-tolylphosphine. Suitable solvents include acetonitrile, and suitable reaction temperatures include 125° C. The 2-vinylcyclobutapyridine can be contacted with styrene in the presence of a free-radical initiator to provide a vinyl bridged poly(cyclobutapyridine).

In yet another example, 2-bromocyclobutapyridine can be employed to prepare a monocyclobutapyridine monomer having a vinyl bridging member connecting the cyclobutapyridine moiety with an organic molecular group, such as an aromatic moiety. For example, to prepare 1-(4-methylphenyl)-2-(2-cyclobutapyridyl)ethene, an amount of 2-bromocyclobutapyridine is contacted with a substantially equal to slightly greater molar amount of 4-methylstyrene in the presence of a suitable catalyst system, in a suitable solvent under suitable reaction conditions. Suitable catalyst systems include palladium (II) acetate and a suitable cocatalyst includes tri-o-tolylphosphine. Suitable solvents include acetonitrile, and suitable reaction conditions include refluxing for a sufficient time.

The dienophilic moieites are moieties which react with conjugated dienes to form a six-member ring. Such moieties are discussed in Morrison and Boyd, *Organic Chemistry*, 3rd Ed., 1979. Suitable moieties are alkenyl moieties and preferably are unsaturated hydrocarbon moieties having an electron-withdrawing group on an adjacent carbon. Suitable electron-withdrawing groups are oxygen, nitrogen, halogens, phosphorous and the like. Especially preferred dienophilic moieties are $\alpha\beta$-unsaturated carbonyl compounds, and the most preferred moieties are maleimide moieties.

The more preferred comonomers are comonomers which contain polymerizable dienophilic moieties which polymerize at about (i.e., within 50° C.) of the temperature at which the arylcyclobutane-containing monomers polymerize. The most preferred comonomers contain maleimide moieties. The maleimide-containing comonomers polymerize at about 200° C. Such comonomers can be represented by the formula:

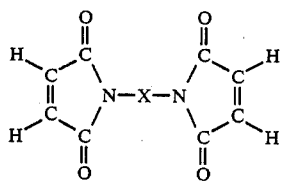

wherein X is a polyvalent organic or inorganic moiety. Preferred X groups are:

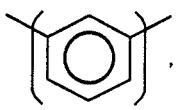 (VII)

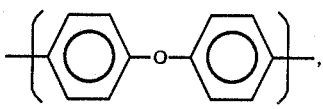 (VIII)

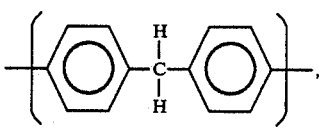 (IX)

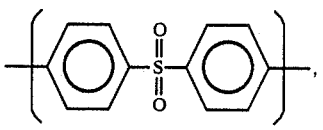 (X)

and

, (XI)

wherein n is at least 1.

Methods of preparing such maleimides are disclosed in *Polymer*, Vol. 26, p. 1561, September 1985, herein incorporated by reference.

Yet other preferred dienophilic moieties are alkylene moieties, especially acetylenic moieties.

The amounts of the arylcyclobutane-containing comonomer and the dienophilic comonomer which are employed in preparing the copolymers of this invention can vary. The arylcyclobutane monomer is employed at less than 100 percent by weight of the comonomer mixture, and the dienophilic comonomer is employed at less than 100 percent of the comonomer mixture. Preferably, if the dienophilic comonomer polymerizes at a temperature below the polymerization temperature of the arylcyclobutane comonomer, the ratio of the amount of dienophilic comonomer to the amount of arylcyclobutane comonomer is greater than one.

In addition to the arylcyclobutane comonomer and dienophilic comonomer, the copolymer composition of this invention can be comprised of other monomeric or polymeric compositions which can independently polymerize to provide an interpenetrating network or can copolymerize with the comonomers. Suitable optional monomeric or polymeric compositions include monoarylcyclobutane monomers (i.e., monomers which contain only one arylcyclobutane moiety) and other poly(arylcyclobutane) monomers (i.e., monomers which contain at least two arylcyclobutane moieties). Preferred monoarylcyclobutanes are A,B-monomers which have a polymerizable benzocyclobutane moiety and a reactive maleimide moiety. Such monomers can correspond to the formula

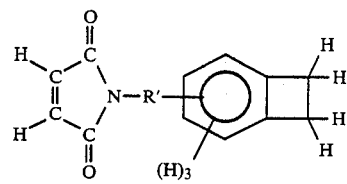 (XII)

wherein R' is a direct bond, or a polyvalent organic or inorganic moiety, and can be the same or different as R. Such A,B-monomers can be prepared by dehydrating benzocyclobutyl maleamic acid. The maleamic acid derivatives and methods for preparing them are disclosed in U.S. patent application Ser. No. 727,162, which was allowed on June 12, 1986, now U.S. Pat. No. 4,638,078, herein incorporated by reference.

The copolymer composition can also contain optional components which are determined by the particular use of the copolymer. Such optional components include fibrous fillers such as glass, quartz and graphite fibers; organic and inorganic powder fillers; catalysts; curing agents; fire retardants; and the like. For example, the copolymer composition can contain an amount of an electro-conductive metal such as silver or gold powder and can be used as a die-attach material. In another example, the copolymer composition can contain an amount of reinforcing glass fibers and can be used as a composite.

The copolymer composition is prepared by combining the arylcyclobutane comonomer and the dienophilic comonomer to form a mixture and treating the comonomer mixture at sufficient polymerization conditions. The comonomer mixture can thermally polymerize, so the application of heat is a preferred polymerization process.

When preparing the most preferred copolymers from benzocyclobutane comonomers and bismaleimide comonomers, suitable polymerization temperatures are temperatures at which the cyclobutane rings open to provide a diene-type structure. Preferably such temperatures range from about 180° C. to about 270° C.

Ideally, the copolymers of the benzocyclobutane and bismaleimide comonomers can contain units which can be represented by the formula:

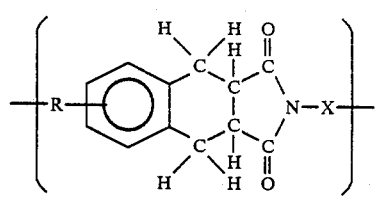

wherein R and X are as defined above.

Preparing the copolymers of this invention can improve the physical properties of homopolymers prepared from the comonomers. For example, adhesion/thermal stability, solvent resistance, dielectric constant, elongation at break (toughness), and the like can be improved. Also, surprisingly, the hot wet strength of the maleimide polymers can be increased.

The following example is an illustration and does not limit the scope of the invention.

EXAMPLE—COPOLYMERS OF POLY(STYRENE-CO-4-VINYLBENZOCYCLOBUTANE) WITH THE BISMALEIMIDE DERIVED FROM 4,4'-DIAMINOPHENYLETHER

A blend of the 2 components of this system is prepared initially. This blend is prepared in a 500 ml 2-neck round bottom flask equipped with a gas inlet tube and positive nitrogen pressure provided with a mineral oil bubbler, magnetic stirrer and stopper. To this is added 100 ml of dichloromethane and 25 g of poly(styrene-co-4-vinylbenzocyclobutane) (5 percent 4-vinylbenzocyclobutane, 1.25 g 4-vinylbenzocyclobutane, MW=130.29, 0.0096 equivalents). This mixture is stirred until complete dissolution occurs. To this mixture is added 3.45 g 4,4'-diphenyl ether bismaleimide (MW=360, 0.00958 moles) and 150 ml of dichloromethane. This mixture is stirred until complete dissolution occurs.

The yellow solution is poured into a cake pan which has been covered with a Teflon sheet, and the dichloromethane is allowed to evaporate in a fume hood overnight. The resultant homogeneous, bright yellow polymer sheet is cut into small pieces with scissors and these pieces are then ground using a Wiley laboratory mill. The ground polymer is then dried in a vacuum oven overnight (0.1 mm Hg, 100° C.). This dried powder weighs 19.7 g, or 69 percent recovery. Differential scanning calorimetry shows a glass transition at 86° C., and one major polymerization exotherm which peaks at 259.8° C.

A piece of heavy gauge alluminum foil is coated with a suitable mold release agent and placed on a flat steel plate with the coated surface facing up. On top of this is placed a steel plate in which is cut a hole in the shape of a standard tensile test bar. The assembly is then sprayed with a mold release agent. The benzocyclobutane/bismaleimide mixture is then placed in the mold shape, and the copolymer is pressed down into the mold with a spatula. More copolymer is placed on top of this, and the copolymer is then covered with another piece of release-agent-treated aluminum foil and another steel plate. The apparatus is then entered into a hydraulic press which has been heated to 210° C., and the platens are closed until they just touch both plates. The mold is then allowed to sit for 10 minutes while the copolymer melts; the mold is then pressurized to 15 tons ram force. The mold is then heated to 255° C. over about 10 minutes. The mold is maintained between 250° C. to 255° C. for another 10 minutes. At the end of this time, the pressure is released and the molding apparatus is transferred from the hot press directly to a cold press, where the mold is allowed to cool for about 10 minutes. The copolymer part is then removed and is brown-orange in appearance, weighing 6.7 g.

The copolymer, containing 9.6 millimoles benzocyclobutane and 9.6 millimoles bismaleimide, exhibits a glass transition of 86° C. prior to polymerization. The copolymer sample completely disintegrates in methylene chloride, whereas the copolymer obtained by thermally copolymerizing the bismaleimide and the polystyrene-co-4-vinylbenzocyclobutane swells but does not dissolve or disintegrate.

A mixture of 7.5 percent vinylbenzocyclobutane-containing polystyrene-co-4-vinylbenzocyclobutane with 1 mole of bismaleimide per mole benzocyclobutane gives a copolymer which exhibits a glass transition prior to curing of 108° C. to 111° C. The curing of this material by heating to 300° C. gives a copolymer with a glass transition temperature from roughly 114° C. to 121° C. Another sample of a mixture containing 5 percent benzocyclobutane and 3.85 millimoles bismaleimide is prepared and crosslinked by heating to 320° C. The uncured material exhibits a glass transition temperature of 89° C., while after curing, the glass transition temperature moves to 110° C. All of the samples of polystyrene-co-4-vinylbenzocyclobutane admixed with bismaleimide exhibit a polymerization exotherm beginning at 190° C. to 200° C. and peaking near 250° C. to 260° C.

What is claimed is:

1. A copolymer composition comprising, in polymerized form, a comonomer containing at least two polymerizable arylcyclobutane moieties, and a comonomer containing at least two polymerizable dienophilic moieties.

2. The copolymer composition of claim 1 wherein the arylcyclobutane moieties are benzocyclobutane moieties.

3. The copolymer composition of claim 2 wherein the dienophilic moieties are alkenyl moieties.

4. The copolymer composition of claim 2 wherein the dienophilic moieties are $\alpha,\beta$ -unsaturated carbonyl moieties.

5. The copolymer composition of claim 2 wherein the dienophilic moieties are maleimide moieties.

6. The copolymer composition of claim 1 wherein the comonomer containing at least two polymerizable arylcyclobutane moieties is poly(styrene-co-4-vinylbenzocyclobutane) and the comonomer containing at least two polymerizable dienophilic moieties is 4,4'-diphenyl ether bismaleimide.

7. The copolymer composition of claim 5 wherein the ratio of amount of the maleimide-containing monomer to benzocyclobutane-containing monomer is greater than 1.

* * * * *